Patented June 23, 1925.

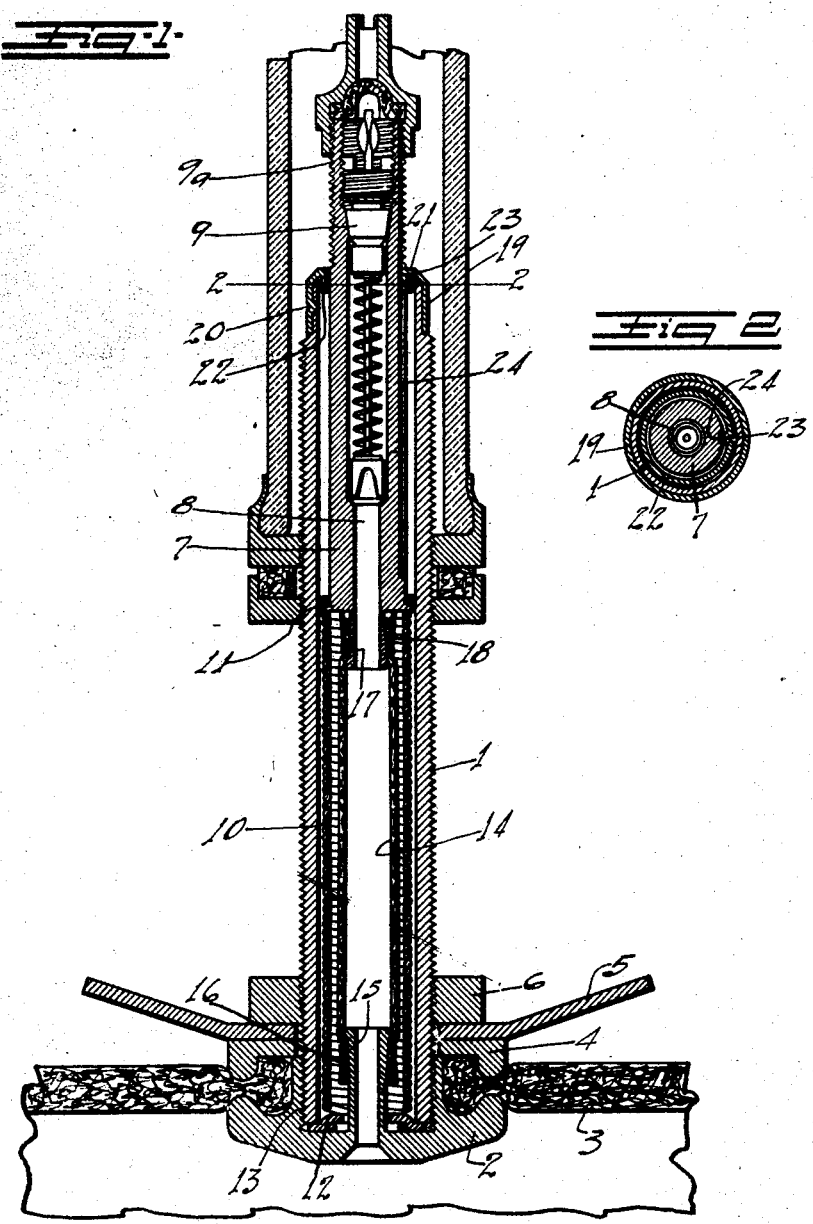

1,542,926

UNITED STATES PATENT OFFICE.

PARK E. WELTON, OF CUYAHOGA FALLS, OHIO, ASSIGNOR TO TIREGAGE VALVE CORPORATION, OF CHARLESTON, WEST VIRGINIA, A CORPORATION OF WEST VIRGINIA.

PNEUMATIC TIRE-PRESSURE GAUGE.

Application filed January 17, 1923. Serial No. 613,253.

*To all whom it may concern:*

Be it known that I, PARK E. WELTON, a citizen of the United States, residing at Cuyahoga Falls, in the county of Summit and State of Ohio, have invented new and useful Improvements in Pneumatic Tire-Pressure Gauges, of which the following is a specification.

Tire pressure gauges formed with a tire stem and sliding plunger have heretofore been made with a rubber tube forming a means of connection between the plunger and the inner part of the tire stem and communicating the pressure from the tire to the stem and also a conduit for inflating the tire. With most such devices it is desirable to assemble the parts by turning some parts of the mechanism which includes the plunger and the rubber tube. It is also desirable with these structures to lock the plunger against turning so as to adapt it to receive the strain incident to attaching a tire pump. The rubber tube is subjected to severe use and if twisted often develops leaks at the point at which it is twisted. In such devices it is also desirable to limit the movement of the plunger. The present invention is designed to provide a convenient means for locking the plunger and for limiting its outward movement in which the possibility of twisting the rubber tube regardless of the manner of assembling the device is obviated. Other details of the invention will appear from the specification and claims.

The invention is illustrated in the accompanying drawings as follows:—

Fig. 1 shows a central vertical section through the tire stem.

Fig. 2 a section on the line 2—2 in Fig. 1.

1 marks the tire stem, 2 the head of the stem, 3 a tire tube, 4 a clamping plate, 5 a spreader and 6 the clamping nut. These so far as described are of general construction.

A sliding plunger 7 is mounted in the stem. It has an inflation opening 8 through it controlled by a valve 9 and has a screw-threaded end 9ª by means of which the pump may be attached. A spring 10 is secured on a shoulder 11 at the lower end of the plunger and has its lower end hooked into a washer 12 which is secured in place under the end of the stem, the stem being screwed into a screw-threaded socket 13 in the head.

A rubber tube 14 forms a means of communication between the plunger and the inner end of the stem. The head 2 is provided with a nipple 15 which extends upwardly to within the stem and the lower end of the tube is secured by a band 16 on the nipple. The upper end of the tube is secured on a nipple 17 at the lower end of the plunger by a band 18.

A thimble 19 is adapted to be forced over the end of the stem 1 after the parts are assembled and is locked in place by indenting the walls of the thimble at 20 into the wall of the stem. The thimble has an inturned flange 21 which operates against the spring forming a shoulder on the lower end of the plunger and thus forms a stop limiting the outward movement of the plunger. The thimble has a crimped axial inward projection 22 engaging the plunger and forming a guide for it and this has a key 23 pressed in its walls which projects into a key-way 24 in the wall of the plunger. The locking indenture 20 locks the thimble against turning and the key operating in the key-way locks the plunger against turning.

It will readily be seen that with this structure any convenient means of assembling the parts may be adopted even though it involves the twisting of the plunger and the thimble is then put in place and locks the plunger against turning and also forms a stop limiting its outward movement.

What I claim as new is:—

1. In a pneumatic tire pressure gauge, the combination of a tire stem; a valve carrying plunger in the stem subjected to the tire pressure and responsive in movement to said pressure; and a thimble secured to the outer end of the valve stem and forming a stop limiting the outward movement of the plunger, said stop being located at the limit of the outward movement of the plunger.

2. In a pneumatic tire pressure gauge, the combination of a tire stem; a valve carrying plunger in the stem subjected to the tire pressure and responsive in movement to said pressure; and a thimble secured to the outer end of the stem, said thimble having means locking the plunger against turning.

3. In a pneumatic tire pressure gauge, the combination of a tire stem; a valve carrying plunger in the stem subjected to the tire pressure and responsive in movement to said pressure; and a thimble secured to the outer end of the stem, forming a stop limiting the outward movement of the plunger and having means locking the plunger against turning.

4. In a pneumatic tire pressure gauge, the combination of a tire stem; a valve carrying plunger in the stem subjected to the tire pressure and responsive in movement to said pressure; and a thimble secured to the outer end of the stem having an inturned flange limiting the outward movement of the plunger, said stop being located at the limit of the outward movement of the plunger.

5. In a pneumatic tire pressure gauge, the combination of a tire stem; a valve carrying plunger in the stem subjected to the tire pressure and responsive in movement to said pressure; and a thimble secured to the outer end of the stem having a key pressed therein for locking the plunger against turning.

6. In a pneumatic tire pressure gauge, the combination of a tire stem; a valve carrying plunger in the stem subjected to the tire pressure and responsive in movement to said pressure; and a thimble secured to the outer end of the stem by indenting the walls of the thimble and the stem, said thimble controlling the plunger.

7. In a pneumatic tire pressure gauge, the combination of a tire stem; a valve carrying plunger in the stem; a rubber tube connecting the plunger with the inner end of the stem, said plunger and tube being assembled with a turning movement of the plunger; and a thimble secured to the outer end of the stem, said thimble having means locking the plunger against turning.

In testimony whereof I have hereunto set my hand.

PARK E. WELTON.